2,766,135

METHOD OF PREPARING TRICYANOVINYL ALCOHOL AND HEAVY METAL SALTS THEREOF, HEAVY METAL SALTS AND HYDRATES OF THE ALCOHOL AND METHOD OF USING THE HEAVY METAL SALT AS A HEAT RECORDING COATING COMPOSITION

William Joseph Middleton, Claymont, Del., assignor to E. I. du Pont de Nemours and Company, Wilmington, Del., a corporation of Delaware No Drawing. Application October 21, 1955, Serial No. 542,090

14 Claims. (Cl. 117—37)

This invention is concerned with a new monohydric organic acid and its heavy metal salts; and is more particularly concerned with tricyanovinyl alcohol, the heavy metal salts thereof, and the preparation of these new compounds.

The discovery and isolation of tetracyanoethylene opened a new field of cyano chemistry based on the versatility and reactivity of this cyanocarbon. Tetracyanoethylene is very sparingly soluble in water, is converted by strong aqueous alkali to a polymeric material, and under mildly alkaline conditions (pH 7–9) is subject to decomposition with evolution of hydrogen cyanide.

My copending application, Serial No. 501,713, filed April 15, 1955, discloses and claims the discovery that when tetracyanoethylene reacts with water at a pH of 7.5–9.5, the decomposition with evolution of hydrogen cyanide involves a simultaneous synthesis of 1,1,2,3,3-pentacyanopropene according to the following equation:

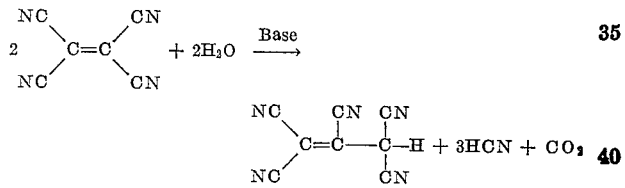

It is an object of the present invention to provide a new class of compounds through the reaction of tetracyanoethylene with water, which have a markedly different chemical structure and unique properties. Another object is to provide methods for preparing the new compounds. Other objects will become apparent from the specification and claims.

In accordance with this invention, the unexpected discovery has been made that another reaction of tetracyanoethylene with water occurs at a pH of less than 7, a reaction which is entirely different from that indicated above, with tricyanovinyl alcohol being produced. This result is surprising, not only in view of the invention of my earlier application, but because the characteristic hydrolysis of nitriles gives amides or carboxylic acids.

Tricyanovinyl alcohol is a strong acid, which can be isolated as a stable crystalline hydrate, and which forms salts with any of the conventional salt-forming cations. The heavy metal salts formed by neutralizing tricyanovinyl alcohol with a cation of a heavy metal are of especial interest as they are characterized by excellent stability to hydrolysis and are useful as paper sensitizers for inkless printing with heat.

It is only necessary for tetracyanoethylene to be mixed with water under slightly acidic conditions, i. e., so that the reaction mixture has a pH barely less than 7, to initiate the conversion of tetracyanoethylene to tricyanovinyl alcohol. Since tricyanovinyl alcohol is a strong acid, the first tricyanovinyl alcohol formed lowers the pH further, and the reaction to form tricyanovinyl alcohol becomes autocatalytic.

The reaction of tetracyanoethylene with water under acidic conditions to form tricyanovinyl alcohol takes place at room temperature or moderately below if sufficient time is allowed. However, it is preferred to operate at 50°–100° C. in order to bring the reaction to completion in a minimum length of time. Conducting the reaction at the boiling temperature is especially preferred since the escaping steam assists in removal of the by-product, hydrogen cyanide. Temperatures in excess of 100° C. may be used, for example by operating in a closed reactor under pressure, but there is ordinarily no advantage to such a procedure.

The term heavy metal is to be understood in its usual meaning as indicating those metallic elements with specific gravity greater than 4 (Hackh's Chemical Dictionary, 3rd edition, the Blakiston Company, 1944, pages 399 and 632).

In the following examples, which illustrate specific embodiments of the invention, parts are by weight except where otherwise indicated.

EXAMPLE I

Tricyanovinyl alcohol

To 600 parts of distilled water at a pH of 6.7, 64 parts of powdered tetracyanoethylene is added. The mixture is boiled until evolution of gas ceases and all the solid has dissolved. The resulting aqueous solution of tricyanovinyl alcohol is cooled under reduced pressure. The pH of this solution (solution A) is found to be 0.75. A portion of solution A is diluted 10:1 with distilled water to give solution B which has a pH of 1.50. Solution B is found to be 0.0793 N acid by titration with 0.1004 N sodium hydroxide. When a portion of solution B is ½ neutralized with 0.1004 N sodium hydroxide, the resulting solution has a pH of 1.9. This value is an approximation of the pKa of tricyanovinyl alcohol in water. A portion of solution B is diluted 10:1 with distilled water to give solution C which has a pH of 2.42.

EXAMPLE II

Tetramethylammonium salt of tricyanovinyl alcohol

A mixture of 256 parts of tetracyanoethylene and 1000 parts of distilled water at a pH of 6.7 is heated to reflux and stirred vigorously until all the solid dissolves. Tetramethylammonium chloride (220 parts) is added to the hot solution of tricyanovinyl alcohol, and the resulting solution is filtered and then cooled. The crystalline precipitate which forms is collected on a filter and washed first with a small amount of water and then with alcohol. There is obtained 306 parts (80% yield) of the tetramethylammonium salt of tricyanovinyl alcohol in the form of long, pale yellow needles (M. P. 210–211° C.). The melting point is not changed by recrystallization from water or alcohol.

Analysis.—Calcd. for $C_9H_{12}N_4O$: C, 56.23; H, 6.29; N, 29.15. Found: C, 56.04, 55.94; H, 6.24, 6.37; N, 29.16, 29.19.

The unusual stability of this product is illustrated by the fact that the tetramethylammonium salt of tricyanovinyl alcohol is recovered unchanged after being heated under reflux for three days in a 30% solution of pyridine in alcohol.

EXAMPLE III

Tricyanovinyl alcohol trihydrate

A solution of 100 parts of the tetramethylammonium salt of tricyanovinyl alcohol in 396 parts of acetone is passed through a column containing an acidic ion-exchange resin ("Amberlite IR–120–H") which has been flushed with acetone to remove most of the water. The material is washed through with additional quantities of acetone. The combined acetone percolate is evaporated to dryness under a stream of nitrogen. The brown residue which forms is recrystallized from water. There is obtained 12 parts of a hydrate of tricyanovinyl alcohol in the form of a yellow powder, which decomposes when heated above 300° C. Analysis indicates that this is a trihydrate.

*Analysis.*—Calcd. for $C_5H_7N_3O_4$: C, 34.7; H, 4.05; N, 24.3. Found: C, 34.96; H, 4.01; N, 23.44, 23.18.

EXAMPLE IV

*N-methylquinolinium salt of tricyanovinyl alcohol*

A slightly acidic mixture of 64 parts of tetracyanoethylene and 500 parts of water is heated and stirred until all of the solid has gone into solution. This solution is filtered and then mixed with a solution of 270 parts of N-methylquinolinium iodide in 1000 parts of water. A yellow precipitate forms. The solution is cooled to 0° C. and the precipitate (134 parts) is collected on a filter, washed with water and recrystallized from water. There is obtained 80 parts of the N-methylquinolinium salt of tricyanovinyl alcohol in the form of light yellow needles, M. P. 134–136° C.

*Analysis.*—Calcd. for $C_{15}H_{10}N_4O$: N, 21.36. Found: N, 21.37, 21.25.

EXAMPLE V

*Quinolinium salt of tricyanovinyl alcohol*

A slightly acidic mixture of 64 parts of tetracyanoethylene and 500 parts of water is heated and stirred until all of the solid has gone into solution. This solution is filtered and the filtrate is mixed with a solution of 130 parts of quinoline in 512 parts of 5% hydrochloric acid. The solution is cooled to 0° C. and the precipitate which forms (85 parts) is collected on a filter, washed with water, and recrystallized from water. There is obtained 60 parts of the quinolinium salt of tricyanovinyl alcohol in the form of light yellow crystals, M. P. 131–132° C.

*Analysis.*—Calcd. for $C_{14}H_8N_4O$: C, 67.74; H, 3.25; N, 22.57. Found: C, 67.67; H, 3.43; N, 22.61, 22.62.

EXAMPLE VI

*Silver salt of tricyanovinyl alcohol*

A solution of 20 parts of the tetramethylammonium salt of tricyanovinyl alcohol in 250 parts of warm water is mixed with a solution of 50 parts of silver nitrate in 1000 parts of water. The precipitate which forms is collected on a filter and washed with water. There is obtained 22 parts of the silver salt of tricyanovinyl alcohol in the form of a yellow powder, M. P. above 300°. This powder burns when ignited to give a greatly expanded ash.

*Analysis.*—Calcd. for $C_5N_3OAg$: C, 26.58; N, 18.60; Ag, 47.75. Found: C, 26.88; N, 18.68, 18.70; Ag, 47.94.

EXAMPLE VII

*Dipyridylsilver salt of tricyanovinyl alcohol*

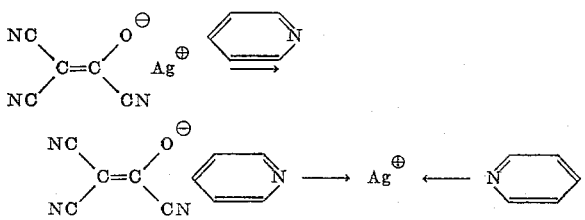

To a solution of 678 parts of the silver salt of tricyanovinyl alcohol in 3130 parts of acetonitrile is added 1470 parts of pyridine. The resulting solution is mixed with 20,000 parts of water, and the precipitate which forms is collected on a filter, washed with water, and recrystallized from water. There is obtained 580 parts of the dipyridylsilver salt of tricyanovinyl alcohol in the form of very light cream-colored, matted needles, M. P. 120–122° C.

*Analysis.*—Calcd. for $C_{15}H_{10}N_5OAg$: C, 46.90; H, 2.63; N, 18.23; Ag, 28.08. Found: C, 46.70; H, 2.69; N, 17.96, 17.71; Ag, 29.13.

EXAMPLE VIII

*Cobaltous salt of tricyanovinyl alcohol*

A slightly acidic mixture of 10 parts of tetracyanoethylene and about 100 parts of distilled water is boiled to yield a solution of tricyanovinyl alcohol. One volume of the resulting solution is added to two volumes of a 10% aqueous solution of cobaltous acetate. The cobaltous salt of tricyanovinyl alcohol is formed as a white precipitate which is collected by filtration and dried.

EXAMPLE IX

*Zinc salt of tricyanovinyl alcohol*

One volume of a tricyanovinyl alcohol solution prepared as in Example VIII is added to two volumes of a 10% aqueous solution of zinc acetate. The zinc salt of tricyanovinyl alcohol is formed as a white precipitate which is collected by filtration and dried.

Other heavy metal salts of tricyanovinyl alcohol are obtained by reaction with salt-forming cations in a similar way, as by treating the heavy metal oxide, hydroxide or carbonate with aqueous tricyanovinyl alcohol. For example, when the heavy metal carbonates indicated in the first column of the table are dissolved in aqueous tricyanovinyl alcohol and the resulting solution is evaporated to dryness, the corresponding metal salts of tricyanovinyl alcohol indicated in the second column are obtained.

TABLE

| Heavy Metal Carbonate | Heavy Metal Salt of Tricyanovinyl Alcohol Formed |
| --- | --- |
| ferrous carbonate | ferrous. |
| cobaltous carbonate | cobaltous. |
| nickelous carbonate | nickelous. |
| zinc carbonate | zinc. |
| cuprous carbonate | cuprous. |
| basic cupric carbonate | cupric. |
| lead carbonate | lead. |
| chromous carbonate | chromous. |
| mercurous carbonate | mercurous. |
| basic mercuric carbonate | mercuric. |
| cadmium carbonate | cadmium. |
| manganous carbonate | manganous. |

Schenck and Finken, Ann. 462, 158–173 (1928), have postulated $(CN)_2:C=C(CN)OK$ as a hydrolytically unstable intermediate in the condensation of malononitrile and ethyl cyanoformate in the presence of potassium ethoxide and alcohol. They did not identify the postulated intermediate but assumed that in an attempted recrystallization from ethyl alcohol it reacted with the alcohol to yield the potassium salt of ethyl dicyanoacetate, which is the only product they did identify. The assumed reaction with alcohol during recrystallization is seen to be unsound when it is considered that an excess of alcohol was present during the original condensation.

The fact that the potassium salt of ethyl dicyanoacetate is the direct and only product from Schenck and Finken's condensation is shown in a repetition of their work as follows:

A solution prepared by dissolving 7.8 g. (0.2 gram atom) of potassium in 100 ml. of absolute ethanol was added dropwise to a cooled, stirred solution of 13.2 g. (0.2 mole; Schenck and Finken used 0.1 mole) of malononitrile and 20.0 g. (0.2 mole) of ethyl cyanoformate in 200 ml. of absolute ethanol. The white solid which precipitated was collected on a filter and washed with a little cold alcohol, and then ether. This product (postulated by Schenck and Finken to be $(CN)_2:C=C(CN)OK$) was recrystallized two times using water instead of alcohol to avoid any possibility of reaction with alcohol during recrystallization. There was obtained 10.0 g. of the potassium salt of ethyl dicyanoacetate in the form of white needles, M. P. 302–305° C.

*Analysis.*—Calcd. for $C_6H_5N_2O_2K$: K, 22.19; C, 40.89; H, 2.86; N, 15.90. Found: K, 21.94; C, 40.71, 40.75; H, 2.65, 3.06; N, 16.01, 16.28.

Further confirmation of the identity of this product as the potassium salt of ethyl dicyanoacetate was obtained by reacting a portion of it with ethylenediamine in 5% aqueous cupric acetate solution. A purple solid precipitated and was collected by filtration, washed with water and recrystallized from water. There was obtained the bisethylenediaminecopper (II) salt of ethyl dicyanoacetate in the form of long purple needles, M. P. 257–260° C.

*Analysis.*—Calcd. for $C_{16}H_{26}N_8O_4Cu$: Cu, 13.88; N, 24.47. Found: Cu, 13.80, 13.80; N, 24.37, 24.28.

The hydrolytic stability of the tricyanovinyl alcohol derivatives of the present invention is in sharp contrast with what would be expected on the basis of Schenck and Finken, and points out the speculative character of their disclosure.

The heavy metal salts of tricyanovinyl alcohol are unusually stable to hydrolytic decomposition when wet, even when heated up to 100° C. However, in the dry state they respond to heat at temperatures of 175° C. and above, and particularly above 200° C., by turning to a contrasting dark color. These darkened residues from the heavy metal salts of tricyanovinyl alcohol after heating have a high hiding power and compositions containing these salts are highly useful for recording thermal impressions on paper and other surfaces. This property of developing with heat to form a dark pigment is illustrated with respect to the silver salt of tricyanovinyl alcohol as follows.

One part of the silver salt of tricyanovinyl alcohol, one part of a 15% solution of polyvinyl alcohol (binder) in a 4/1 alcohol/water mixture and about 10 parts of a volatile aliphatic alcohol are ball milled by glass beads in a glass container until a fine suspension is obtained. A thin coating of this suspension is spread on a sheet of uncoated paper and the paper is dried. The presence of the dried coating is not detectable by the unaided eye. The coated paper is placed on a wooden block covered with suede leather. Clean brass type is heated to 244° C. and pressed gently against the coated face of the paper for one second. There is developed, a black, sharp impression of the type on the paper. When brass type at 244° C. is similarly pressed against uncoated paper, no permanent impression is made.

The other heavy metal salts of tricyanovinyl alcohol may be used in place of the silver salt as pigments in coating compositions for inkless printing with heat as illustrated above, the copper, zinc, lead and mercury salts being preferable.

Since many different embodiments of the invention may be made without departing from the spirit and scope thereof, it is to be understood that the invention is not limited by the specific illustrations except to the extent defined in the following claims.

What is claimed is:

1. The method of preparing a tricyanovinyl compound which comprises reacting tetracyanoethylene with water at a pH below 7.

2. The method of preparing a salt of tricyanovinyl alcohol which comprises reacting tetracyanoethylene with water at a pH below 7 to form a solution of tricyanovinyl alcohol, reacting the tricyanovinyl alcohol with a salt-forming cation, and isolating the resulting salt of tricyanovinyl alcohol from the reaction mixture.

3. The method of preparing a heavy metal salt of tricyanovinyl alcohol which comprises heating a mixture of tetracyanoethylene and water at a pH below 7 to form a solution of the acid, tricyanovinyl alcohol, neutralizing the acid with a cation of a heavy metal, and isolating the resulting heavy metal salt of tricyanovinyl alcohol from the reaction mixture.

4. The method of preparing tricyanovinyl alcohol which comprises heating a mixture of tetracyanoethylene and water at a pH below 7 and isolating the tricyanovinyl alcohol formed.

5. A hydrate of tricyanovinyl alcohol.

6. A heavy metal salt of tricyanovinyl alcohol.

7. A heavy metal salt of tricyanovinyl alcohol characterized by turning to a contrasting dark color upon heating above 200° C.

8. A coating composition containing a heavy metal salt of tricyanovinyl alcohol as the pigment and characterized by darkening to provide a high hiding power when applied to a surface and heated above 200° C.

9. The method of forming thermal impressions which comprises coating a surface with a composition containing a heavy metal salt of tricyanovinyl alcohol and heating portions of the coating to darken the heavy metal salt.

10. Paper coated with a heavy metal salt of tricyanovinyl alcohol to sensitize the paper for inkless printing with heat.

11. A silver salt of tricyanovinyl alcohol.

12. A copper salt of tricyanovinyl alcohol.

13. A zinc salt of tricyanovinyl alcohol.

14. A lead salt of tricyanovinyl alcohol.

References Cited in the file of this patent

UNITED STATES PATENTS 2,375,185    Bergel _____ May 8, 1945